United States Patent [19]

Suzuki et al.

[11] Patent Number: 4,824,708
[45] Date of Patent: Apr. 25, 1989

[54] PROCESS FOR PRODUCING MAGNETIC RECORDING MEDIUM

[75] Inventors: Takashi Suzuki, Yokohama; Akinori Hasu, Sagamihara; Hiroshi Yoshida, Kawasaki; Shigeru Hashimoto, Yokohama, all of Japan

[73] Assignee: Canon Kabushiki Kaisha, Tokyo, Japan

[21] Appl. No.: 928,420

[22] Filed: Nov. 10, 1986

[30] Foreign Application Priority Data

Nov. 11, 1985 [JP] Japan .................................. 60-250853
Nov. 20, 1985 [JP] Japan .................................. 60-258677

[51] Int. Cl.⁴ .............................................. G11B 5/70
[52] U.S. Cl. ........................................ 428/64; 427/48; 427/130; 428/694; 428/900
[58] Field of Search .................... 428/694, 64, 900; 427/48, 128, 130

[56] References Cited

U.S. PATENT DOCUMENTS 4,189,508  2/1980  Chiba et al. ............................ 427/48
4,578,280  3/1986  Grainer et al. ...................... 427/130
4,678,682  7/1987  Asai et al. ............................... 427/48

OTHER PUBLICATIONS

IEEE Standard Dictionary of Electrical and Electronics Terms, Copyright 1984, p. 318.
Specification of Still Video Floppy Disc Systems, Published by Engineering Department Electronic Industries Association of Japan, Sep. 1987, p. 14.

*Primary Examiner*—Paul J. Thibodeau
*Attorney, Agent, or Firm*—Fitzpatrick, Cella, Harper & Scinto

[57] ABSTRACT

A disk-form magnetic recording medium having a minimized change in output on an output envelope is produced by a process which comprises coating a nonmagnetic substrate with a magnetic paint and applying a magnetic field for orientation to the magnetic paint in a yet unsolidified state on the substrate moved in a direction. The magnetic field for orientation is made stronger in a direction perpendicular to the moving direction of the coated substrate than in the moving direction. The directional change in magnetic field for orientation is provided, e.g., by a plurality of magnetic poles having different magnetic powers or disposed with increasing angular spacing in a direction leaving the moving direction of the substrate, or by an electromagnet supplied with a positionally varying current.

8 Claims, 8 Drawing Sheets

PROCESS FOR PRODUCING MAGNETIC RECORDING MEDIUM

FIELD OF THE INVENTION AND RELATED ART

The present invention relates to a disk-form magnetic recording medium adapted to high density recording and a process for producing the same.

In recent years, flexible disk-form magnetic recording media have been extensively used, including flexible disks as a large capacity memory medium for computers and magnetic sheets for still video cameras (video floppy disks).

For magnetic recording media including not only flexible disks and magnetic sheets but also magnetic tapes, a magnetic head moves in contact with the media to effect readout and writing. Accordingly, when a magnetic layer of a magnetic recording medium is formed by coating, it is preferred to form a state where magnetic powder is oriented in the direction of the head movement. More specifically, it is preferred that magnetic powder is oriented in a tape-running direction for a magnetic tape and in a circular direction for a flexible disk or sheet.

When a flexible magnetic recording disk is produced by coating of a magnetic paint, a base film coated with a magnetic paint is generally moved between two rotating rollers disposed with a gap which is slightly larger than the thickness of the base film, whereby the magnetic powder is oriented in the moving or running direction. This is referred to as mechanical orientation. In general, magnetic powder having a larger shape anisotropy, i.e., a larger axial ratio, is readily oriented mechanically and provides a higher squareness ratio through the orientation.

In the case of a magnetic tape, a magnetic tape having an orientation in the moving direction of a magnetic head may be obtained by slitting a coated film prepared in the above described manner using magnetic powder having a large axial ratio through mechanical orientation. However, when such a coated film is punched into a disk form to obtain a flexible magnetic disk or sheet a problem arises. While a magnetic head moves along a circular direction of the product disk, the residual magnetization is larger in the coating direction because of the mechanical orientation, so that there results in a problem that the envelope waveform is not constant and the output changes periodically.

In order to solve the above problem, several processes for providing an annular orientation have been proposed but have not been reduced to commercial practice. As a result, commercially available products at present have been obtained through a contrivance of reducing mechanical orientation in the coating step or using magnetic powder having a small axial ratio to smoothen the envelope as flat as possible. However, as the magnetic powder is not oriented along the circular direction, the squareness ratio becomes poor and the remanence becomes smaller compared with a magnetic tape wherein the magnetic powder is oriented. As a result, in order to get a sufficient output in the disk-form magnetic recording medium, it is necessary to use a broad track width, and that has provided an obstacle to high density recording.

More specifically, in the case of a metal tape, for example, the axial ratio of metal magnetic powder can be varied in the range of about 5-15, but magnetic powder having an axial ratio around 10 may generally be used. A magnetic tape prepared by using such magnetic powder of long needle shape provides a squareness ratio of around 0.55 even without orientation and about 0.6-0.65 if subjected to mechanical orientation. Further, when a sheet coated with a yet-unsolidified magnetic paint is passed between two plate magnets disposed so that the same magnetic poles face each other to effect magnetic field orientation as disclosed in Japanese Patent Publication No. 2536/1959, the squareness ratio may be increased to about 0.8-0.85. On the other hand, a metal video floppy disk prepared with suppression of magnetic field orientation has substantially the same squareness ratio of about 0.55-0.65 in the circular direction as a non-oriented tape and an output which is smaller by about 3 dB compared with a tape provided with magnetic field orientation.

As a magnetic recording medium having a circular orientation which has solved that above problem, there is a hard disk obtained by spin coating. However, in the case of the spin coating, the substrate is first shaped into disks, and the disks are individually subjected to coating one by one, so that the productivity is poor and the production cost becomes high.

A method for providing a circular orientation by externally applying a magnetic field is disclosed in Japanese Patent Publication No. 23626/1965. In the method, a base film coated with magnetic paint in a yet unsolidified state is brought close to a rotating face with magnetic poles so that its rotating axis is held in a relatively still state to orient the magnetic powder in a concentric circular direction, and thereafter the magnetic face is left apart. In a specific example of the method, the rotating magnetic field is supplied from one side of the base film, but a better result is obtained if a rotating magnetic pole is provided also on the other side so that their magnetic poles of the same polarity face each other with the base film therebetween as shown in the above described Japanese Patent Publication No. 2536/1959 with respect to a tape. A conceptual view of such an apparatus is shown in Japanese Laid-Open Patent Appln. No. 62505/1978.

In the above described orientation method utilizing a rotating magnetic field, the orientation force exerted by the magnetic field is basically the same at any point on a circle. On the other hand, the mechanical orientation force is stronger in the base film running direction, so that there results in a difference in orientation between the direction parallel to and the direction perpendicular to the base film running direction even after the magnetic field orientation. This difference in orientation can be decreased by using magnetic powder having a small axial ratio (needle shape ratio), but the squareness ratio after the orientation becomes larger when magnetic powder having a larger shape anisotropy is used. Therefore, in order to obtain a higher residual flux density which generally leads to a higher recording density, it is preferred to use magnetic powder having a larger axial ratio (needle-shape ratio). In such a case, there arises a problem that the directional difference in orientation due to mechanical orientation becomes further increased.

SUMMARY OF THE INVENTION

An object of the present invention is to provide a magnetic recording medium having equal orientation in the circular direction and squareness ratio at any point on a circular track even when a mechanical orientation which is a unidirectional orientation and a rotational magnetic field orientation which is a circular orientation, are superposed.

A further object of the present invention is to provide a magnetic recording medium with a squareness ratio which is retained at a high level and is still equal at any point on a circular track by using a magnetic paint containing needle-shaped magnetic powder having a large axial ratio which is preferred in a case of unidirectional orientation, i.e., for tape production, and by using a coating step where a mechanical orientation is applied in combination with a rotational magnetic field oreintation.

According to the present invention, there is provided an improvement in a process for producing a magnetic recording medium comprising coating a nonmagnetic substrate with a magnetic paint and applying a rotating magnetic field by orientation to the magnetic paint in a yet unsolidified state on the substrate, the improvement wherein the magnetic field for orientation is stronger in a direction perpendicular to the moving direction of the substrate than in the moving direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10A–10D are plan views showing examples of combination of rotary magnetic poles and a magnetic flux transmission filter;

DETAILED DESCRIPTION OF THE PREFERRED EMBODIMENTS

Figure 1:
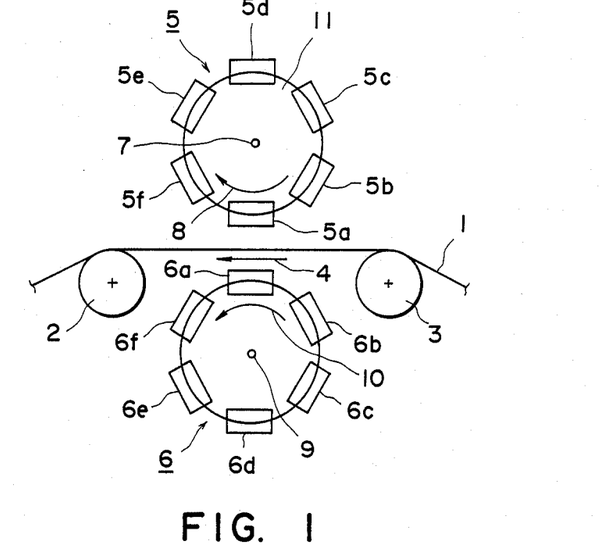
FIG. 1 is a schematic side view of an apparatus for practicing the process according to the present invention.

Referring to FIG. 1, a coated film 1 is one which has been obtained by coating a base film with a magnetic paint, and after the magnetic film is dried and solidified, the coated film is cut into a disk or tape to provide a magnetic recording medium. The magnetic paint of the coated film 1 has not been solidified while it is conveyed by conveying rollers 2 and 3 as shown in FIG. 1. In this state, the coated film 1 is moved at a constant speed in the direction of an arrow 4. Above and below the coated film 1, rotary orientation devices 5 and 6 are disposed in this embodiment. Either one of the rotary orientation devices 5 and 6 may be omitted as desired in some cases. The rotary orientation device 5 comprises rotary magnetic poles 5a, . . . 5f on the circumferential face of a rotary drum 11. The rotary drum 11 rotates at a constant speed around a central axis 7 in a direction of an arrow 8, and the circumferential speed of the rotary magnetic poles 5a, . . . 5f is equal to the running speed of the coated film 1.

The rotary orientation device 6, similarly as the rotary orientation device 5, comprises rotary magnetic poles 6a, . . . 6f disposed on the circumference of a rotary drum 12, which rotates around the central axis 9 in the direction of an arrow 10, i.e., in the opposite direction to that of the rotary drum 11, at the same speed as the rotary drum 11. The rotary magnetic poles 5a, . . . 5f and 6a, . . . 6f rotate with oscillation (in the manner of oscillation or reciprocal partial rotation) or rotate in one direction.

As stated above, the rotary magnetic poles can be disposed on one side of the coated film with a yet unsolidified magnetic layer, but may preferably be disposed on both sides of the coated film so as to face each other. In this case, when the two sets of magnetic poles are disposed at the same gap from the coated film, it is most preferred that the two sets of magnetic poles are disposed and moved so as to form reflected images with respect to the coated film. In this state, the magnetic lines of flux becomes parallel to the coated film in the vicinity of the coated film, so that magnetic powder in the magnetic paint is oriented parallel to the base film.

First, an embodiment of producing a magnetic recording medium through oscillatory rotation of the magnetic poles 5a, . . . 5f and 6a, . . . 6f.

Figure 2:
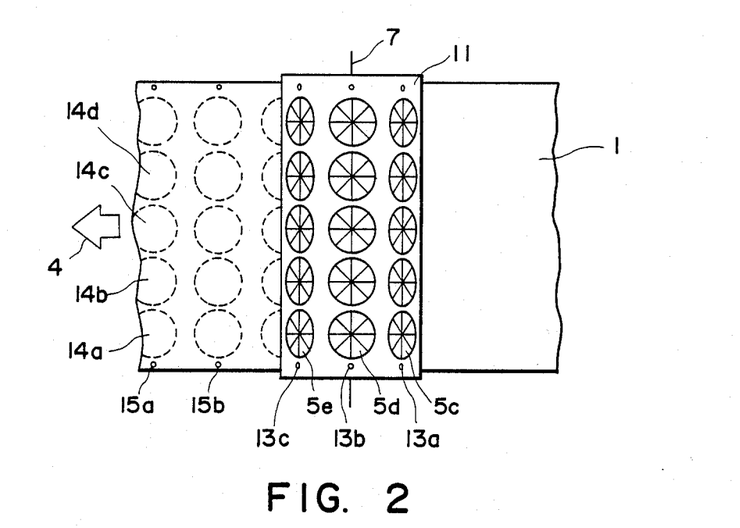
FIGS. 2 and 5 are respectively a schematic plan view for illustrating a mode of magnetic field orientation according to the present invention.

FIG. 2 is a schematic plan view for illustrating the above mentioned mode of magnetic field orientation. The magnetic poles 5a, . . . 5f and 6a, . . . 6f held on the rotary drum 11 are rotated with oscillation, whereby circular orientation patterns 14a, 14b, 14c . . . are formed on the yet unsolidified magnetic paint layer of the coated film 1 moving in the direction of the arrow 4. Simultaneously, alignment marks 15a, 15b . . . are written on both lateral sides of the coated film 1 so that disks may be punched accurately in conformity with the circular orientation patterns. These alignment marks are formed, e.g., by marking devices 13a, 13b, 13c . . . disposed on the rotary drum with a definite positional relationship with the rotary magnetic poles mechanically, physically by using light, heat, magnetism, etc., or chemically by means of, e.g., an ink jet process.

Figure 3:
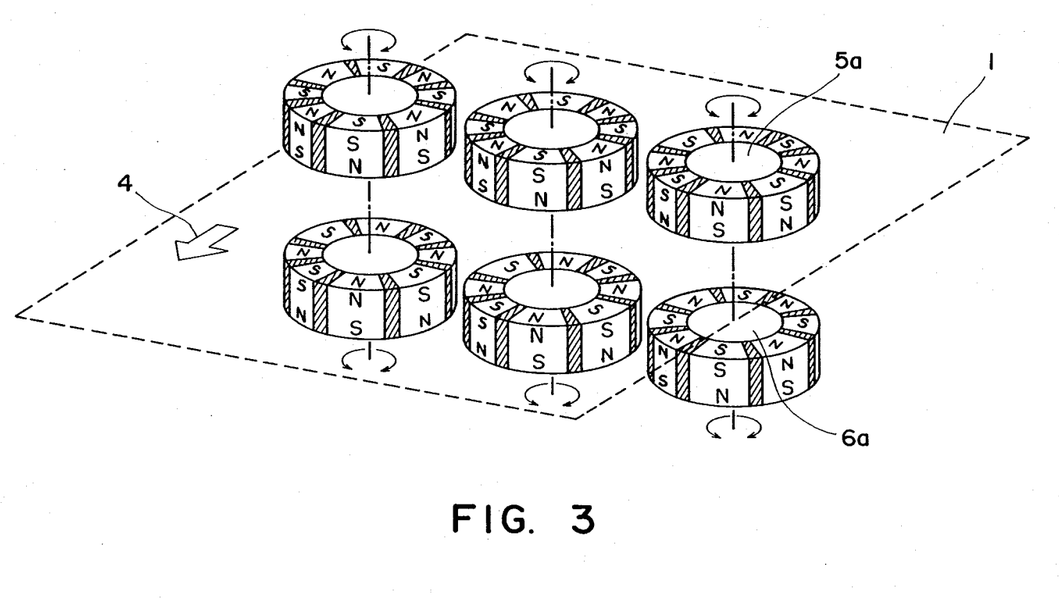
FIG. 3 is a schematic perspective view illustrating a positional relationship between a coated film and rotary magnetic poles.

FIG. 3 illustrates relative positions of, e.g., the rotary magnetic poles 5a and 6a, respectively in a plurality, with respect to the coated film 1, and the coated film 1 is passed in the direction of arrow 4 between the rotary magnetic poles 5a and 6a rotating with oscillation.

FIGS. 4A–4D show rotary magnetic poles 30, 31, 32 and 33, each corresponding to one of the rotary magnetic poles 5a, . . . 5f and 6a, . . . 6f shown in FIGS. 1 and 2.

Figure 4A:
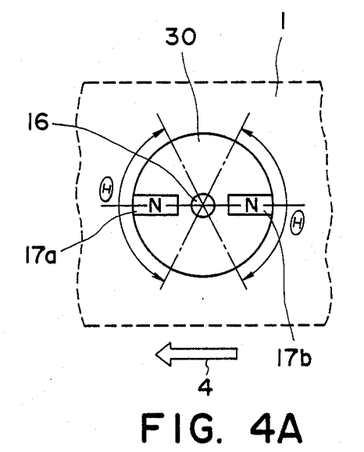
FIGS. 4A–4D are plan views showing arrangement of magnetic poles in rotary magnetic poles.

FIG. 4A illustrates a simplest form of rotary magnetic poles. The rotary magnetic poles 30 comprise magnetic poles 17a and 17b which are shown to be disposed in a line parallel to the moving direction 4 of the coated film 1. The rotary magnetic poles 30 rotate with oscillation with an angle ⊕ about an axis 16 connected to a oscillatory rotation drive means (not shown). The angle ⊕ in this embodiment is about 130°. As for the arrangement of the magnetic poles 17a and 17b, it is possible that they are both S poles or a combination of an N pole and an S pole.

Figure 4B:
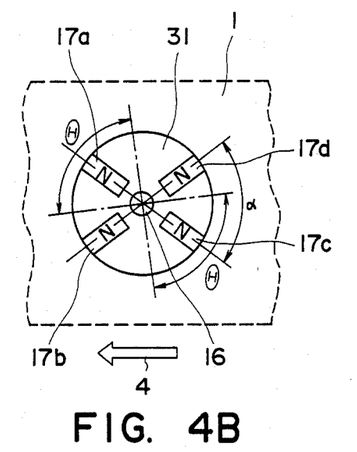

FIG. 4B illustrates an embodiment of 4 magnetic poles. In this example, a line connecting magnetic poles 17a and 17c and a line connecting magnetic poles 17b and 17d form an angle $\alpha$ of 75°. The magnetic poles 17a and 17d and the magnetic poles 17b and 17c are disposed symmetrically with respect to the moving direction 4 of the coated film 4 as their basic positions. The oscillation angle ⊕ of the magnetic poles is 90°. It is possible that the magnetic poles 17a-17d may be all S poles, or it is also possible that the poles 17a and 17c are S poles and the poles 17b and 17d are N poles, or vice versa. In case of this embodiment, as shown in the figure, a period in which the magnetic poles are present on or close to a diametric line passing through the oscillatory rotation axis in parallel with the moving direction of the coated film, if long, so that the magetic field orientation functions most effectively therearound to orient the needle-shaped magnetic powder in the direction perpendicular to the moving direction.

Figure 4C:
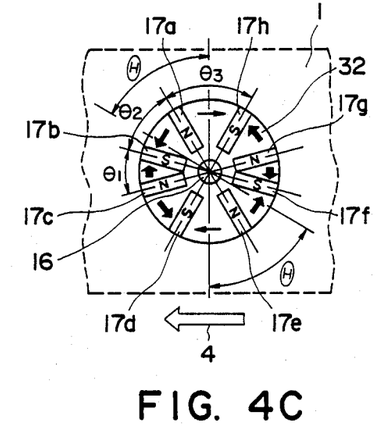

FIG. 4C shows an embodiment of 8 magnetic poles. The respective magnetic poles are so disposed that two of them oppose to each other with respect to the rotation axis of the rotary magnetic poles 32. Further, the respective magnetic poles are disposed symmetrically with respect to the moving direction 4 of the coated film as their basic positions. In this embodiment, magnetic poles 17a, 17c, 17e and 17g and N poles, and poles 17b, 17d, 17f and 17h are S poles. The magnetic poles are so disposed that the angle between adjacent poles increases as they leave in the direction perpendicular to the moving direction of the coated film. More specifically, in this embodiment, the angle $\theta_1$ between magnetic poles 17b and 17c is 30°, the angle $\theta_2$ between 17a and 17b is 45°, and the angle between 17a and 17b is 60°. The angle oscillatory rotation H is 60°. As a result of such arrangement and oscillatory rotation, the orientation magnetic field exerted onto the magnetic powder on the coated film is strongest between the magnetic poles 17b and 17c and between 17f and 17g and weakest between the magnetic poles 17a and 17h and between 17d and 17e. Incidentally, black arrows shown between adjacent magnetic poles schematically represent a magnetic field acting between the magnetic poles with their thickness representing a field strength. In this embodiment, the field strength is so varied that it is strongest in the direction perpendicular to the moving direction of the coated film, by arranging magnetic poles with the same strength and changing the angle between magnetic poles arranged radially.

Figure 4D:
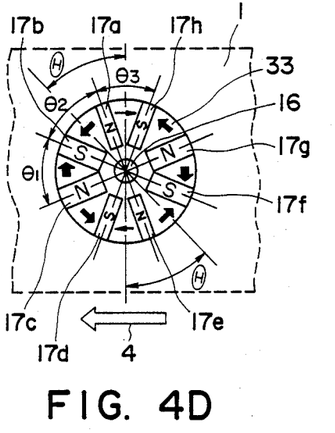

FIG. 4D shows an embodiment of 8 magnetic poles as in FIG. 4C, but magnetic poles 17b, 17c, 17f and 17g are those having a larger strength than magnetic poles 17a, 17d, 17e and 17h. In other words, those magnetic poles arranged closer to the moving direction of the coated film are caused to have a larger strength. Accordingly, $\theta_1$, $\theta_2$, $\theta_3$ and $\theta_4$ are all made equal to 45°. In this embodiment, the orientation magnetic field exerted on the magnetic powder on the coated film becomes strongest in the direction perpendicular to the moving direction of the coated film as in the case of FIG. 4C.

The number of magnetic poles in a rotary magnetic pole system may be arbitrary but may preferably be an even number in view of the oscillatory rotation characteristic of the present invention, that is, as the orientation of the magnetic powder on the coated film is preferably symmetrical with respect to a line passing through the oscillatory rotation axis 16 and perpendicular to the moving direction 4 of the coated film.

The rotary magnetic poles 5a, ... 5f and 6a, ... 6f are placed in a relatively still state with respect to the coated film when they are moved close to the coated film by means of a magnetic field orientation apparatus explained with reference to FIGS. 1 and 2. According to such movement of the rotary magnetic poles, the orientation magnetic field exerted becomes weakest on the part of the magnetic paint on the coated film disposed on a line passing though the rotation axis 16 and perpendicular to the moving direction of the coated film, whereas the mechanical orientation remains most strongly on the part so that the resultant orientation is equilibrated with the orientation of the part of the coating in the angle H where the magnetic orientation has the strongest function.

Figure 5:
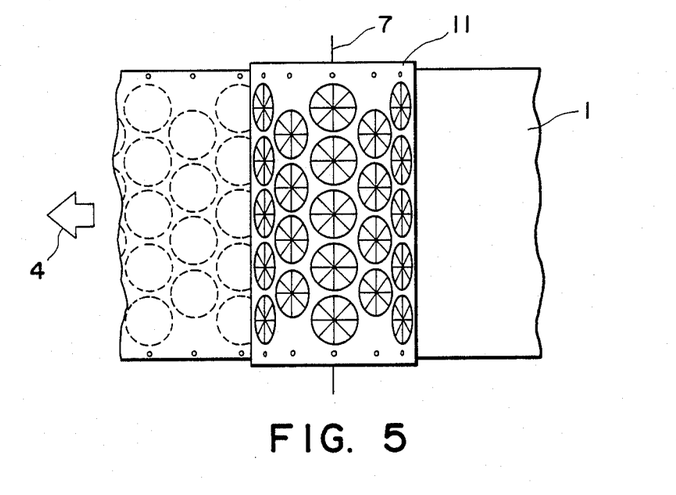

FIG. 5 is a plan view for illustrating another arrangement of rotary magnetic poles on a rotary drum 11.

Figure 13:
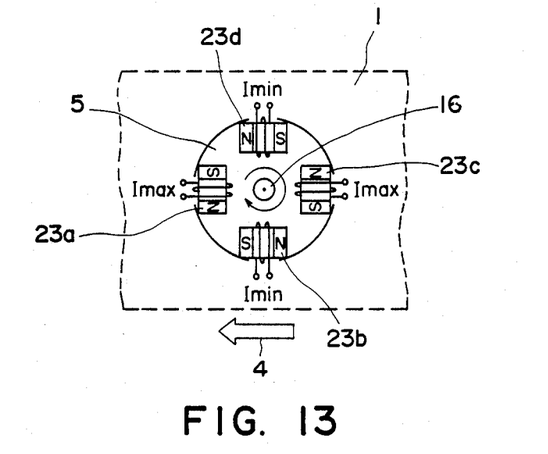
FIG. 13 is a plan view of another example of rotary magnetic poles used in the apparatus shown in FIG. 1.

FIG. 13 illustrates another example of rotary magnetic poles wherein electromagnets are used instead of permanent magnets for providing magnetic poles.

The rotary magnetic poles 5 shown in FIG. 13 comprise 4 horseshoe-shaped electromagnets 23a-23d. The currents supplied to the respective electromagnets are different depending on the location of the electromagnets. More specifically, the current supplied to an electromagnet is strongest when the electromagnet arrives at positions providing magnetic lines of flux perpendicular to the moving direction of the coated film 1, i.e., positions of the electromagnets 23a and 23c in the figure, and is weakest when the electromagnets arrives at positions providing magnetic lines of flux parallel to the moving direction of the coated film 1, i.e., positions of the electromagnets 23b and 23d. The variation in current depending on the position of an electromagnet provides a difference in magnetic field for the magnetic field orientation, which compensates for a periodical difference in output due to mechanical orientation in the circular direction, thereby to provide a flat envelope. In this case, the rotary magnetic poles need not be oscillated but may simply rotate in one rotation, whereby a driving mechanism for rotation can be simplified. Also in this case, the rotary magnetic pole system need not comprise a plurality of magnetic poles but may comprise a single magnetic pole to which a locally varying current is applied.

Further, instead of rotary electromagnets as described above, a rotational magnetic field generator similar to a stator in a flat-type electric motor as disclosed by Japanese Patent Laid-Open Application No. 5007/1974 may also be used. In this case, magnetic poles need not be rotated.

In the present invention, it is preferred that the ratio of the magnetic field for orientation in direction perpendicular to the moving direction of the coated film to that in the moving direction is in the range of 1.05 to 1.50, particularly 1.1 to 1.3.

Figure 6:
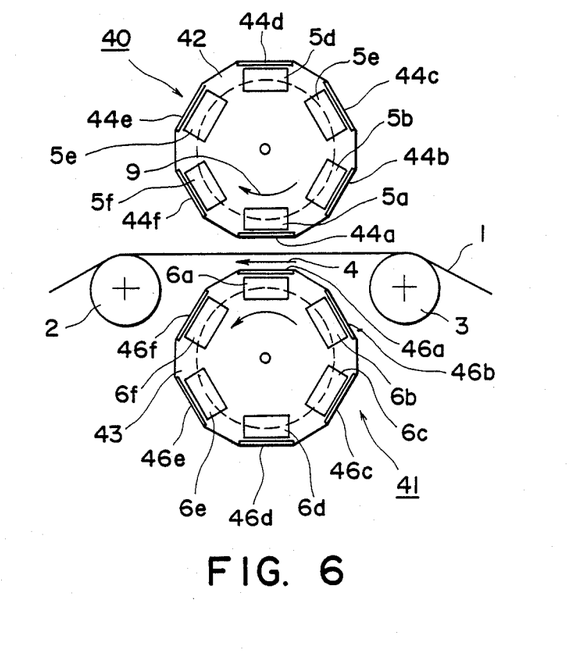
FIG. 6 is a schematic side view of another embodiments of the apparatus for practicing the present invention.

Hereinbelow, the above mentioned mode of producing a magnetic recording medium using rotary magnetic poles 5a, ... 5f and 6a, ... 6f rotating in one direction will be described more specifically with reference to FIG. 6. FIG. 6 illustrates an embodiment of this mode. In this embodiment, magnetic flux transmission filters 44a, . . . 44f and 46a, . . . 46f are disposed in front of rotary magnetic poles 5a, . . . 5f and 6a, . . . 6f.

Rotary orientation devices 40 and 41 correspond to the rotary orientation devices 5 and 6, respectively, shown in FIG. 1. The rotary orientation devices 40 and 41 comprise rotary magnetic poles 5a-5f and 6a-6f on the peripheral surface of rotary drums 42 and 43, respectively. In front of the rotary magnetic poles 5a-5f and 6a-6f, magnetic flux transmission filters 44a-44f and 46a-46f are respectively disposed. In the embodiment shown in FIG. 6, the rotary magnetic poles 5a-5f and 6a-6f rotate respectively in one direction.

Figure 7:
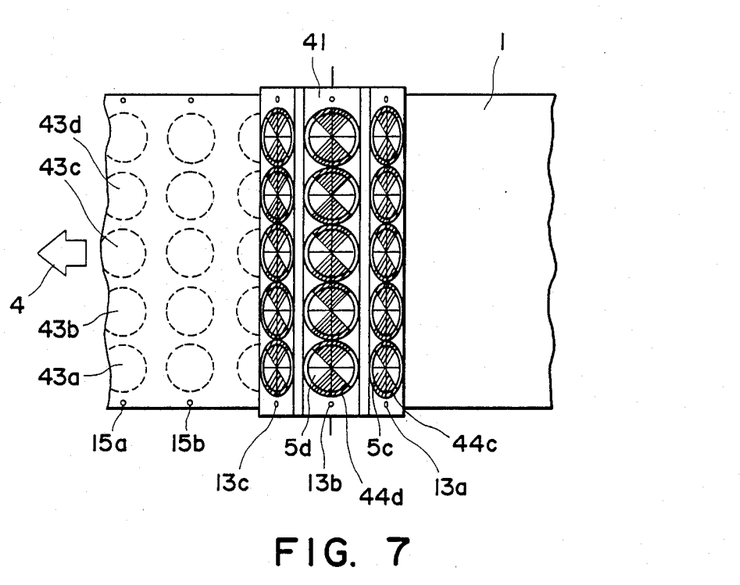
FIG. 7 is a schematic plan view for illustrating a mode of operation using the apparatus shown in FIG. 6.

FIG. 7 is a plan view of the apparatus shown in FIG. 6 and corresponds to the plan view shown in FIG. 2. As a result of rotation of the magnetic poles 5a-5f and 6a-6f in one direction, circular orientation patterns 43a, 43b, . . . are written on the coated film 1.

The magnetic flux transmission filters 44a-44f and 46a-46f are filters each having a transmittance of magnetic flux varying along its circular direction. The magnetic flux transmittance $T_\Phi$ is defined by the equation of $T_\Phi = \Phi(o)/\Phi(i)$, wherein $\Phi(i)$ denotes a magnetic flux entering a filter and $\Phi(o)$ denotes a magnetic flux issuing out of the filter.

Figure 8A:
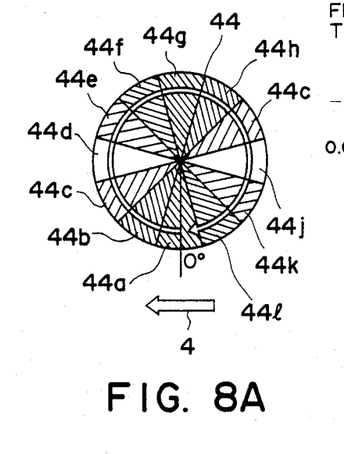
FIG. 8A is a plan view showing a magnetic flux transmission filter used in the embodiment shown in FIG. 6.

FIG. 8A illustrates an example of a magnetic flux transmission filter wherein its area is divided into 12 sectors 44a-44l each having an angle of 30°. It is desired that the magnetic flux transmittance $T_\Phi$ is highest in sectors 44d and 44j providing magnetic fields perpendicular to the moving direction 4 of the coated film and lowest in sectors 44a and 44g providing magnetic field parallel to the moving direction 4 of the coated film, and changes therebetween in the form of a sine wave.

Figure 8B:
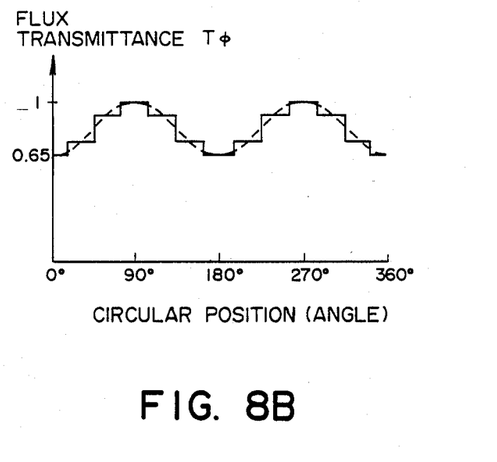
FIG. 8B is a graph showing a relationship between a flux transmittance and a circular position on the filter shown in FIG. 8A.

In the case of FIG. 8A, the filter comprises sectors with 4 steps of flux transmittances, wherein a sector depicted with a denser hatching has a lower transmittance. FIG. 8B shows a variation in transmittance $T_\Phi$ of the filter in the circular direction with a solid stepwise line and the broken line indicates an ideal variation. The variation in $T_\Phi$ of a magnetic flux filter is desirably continuous but may be stepwise as in this embodiment with no problem if the number of division is sufficient.

Such a magnetic flux transmission filter may be produced through various production processes. One of the simplest methods therefor is to coat a disk of a non-magnetic material including plastic, glass or a metal such as aluminum or copper with a layer of a soft magnetic material having a varying thickness along the circular direction, e.g., by physical vapor deposition. As the soft magnetic material, iron or an alloy of iron with Ni, Si, etc., may suitably be used. Further, a thin plate of such a soft magnetic material may be cut into a desired shape to provide a filter.

FIGS. 9A-9D show other embodiments of arrangement of rotary magnetic poles, wherein rotary magnetic poles 50, 51, 52 and 53 correspond to each of the rotary magnetic poles 5a-5f and 6a-6f shown in FIG. 6. In the embodiments shown in FIGS. 9A-9C, magnetic poles 54a-54f are composed of permanent magnets, and in FIG. 9D, magnetic poles 55a-55d are composed of electromagnets.

The arrangement of magnetic poles may be effected in various ways, including those known heretofore used in a rotary magnet for circular magnetic field orientation for providing flexible magnetic disks (Japanese Patent Publication No. 23626/1965) and hard disks (Japanese Laid-Open Patent Applications Nos. 10605/1975 and 47606/1969). Further, a rotational magnetic field generator similar to a stator in a flat electric motor (Japanese Laid-Open Patent Application No. 5007/1974) may also be used.

Figure 9A:
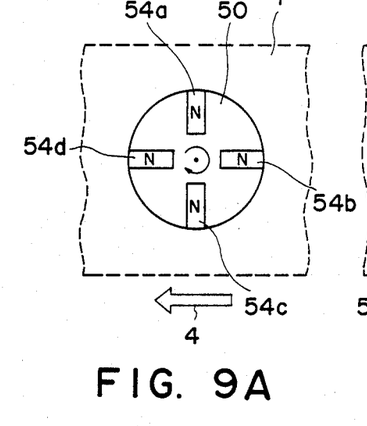
FIGS. 9A–9D are plan views showing some examples of rotary magnetic poles used in the embodiment shown in FIG. 6.
Figure 9B:
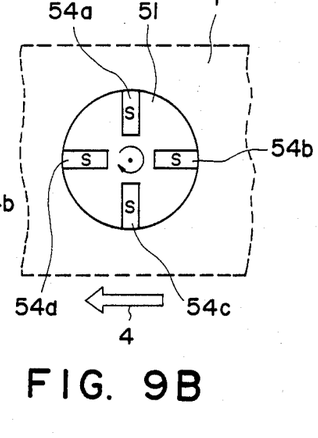
Figure 9C:
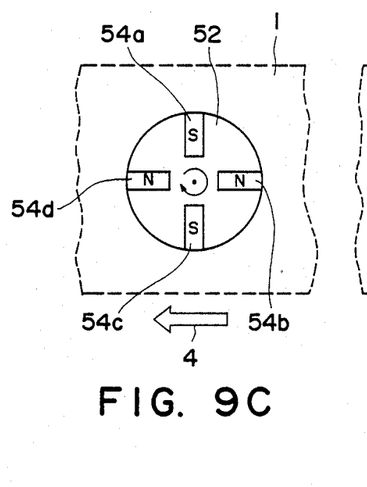
Figure 9D:
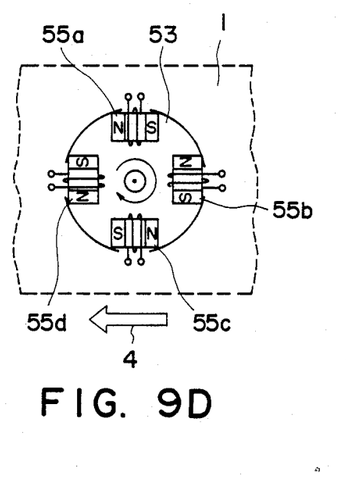
Figures 10A, 10B:
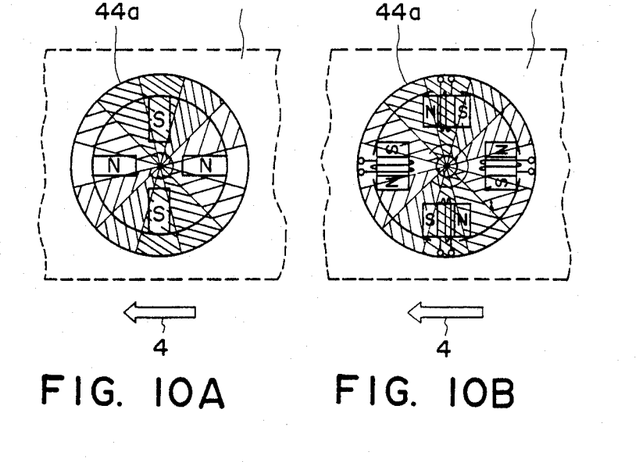

FIGS. 10A and 10B illustrate cases where a magnetic flux transmission filter as explained with reference to FIGS. 8A and 8B is combined with the rotary magnetic poles shown in FIGS. 9C and 9D. The sizes of the magnetic flux transmission filters 44a-44f and 46a-46f may preferably be equal to or even larger than those of the rotary magnetic poles 5a-5f and 6a-6f.

The magnetic flux transmission filters 44a-44f and 46a-46f are disposed between various forms of rotary magnetic poles 5a-5f and 6a-6f and a coated film comprising a flexible film coated with a yet unsolidified magnetic paint layer, and function to transmit the magnetic flux generated by the rotary magnetic poles with attenuation depending on directions or positions. More specifically, the magnetic flux transmission filters are disposed to weaken the orientation magnetic field in the moving direction of the coated film relative to the orientation magnetic field in the direction perpendicular to the moving direction of the coated film.

Figure 11:
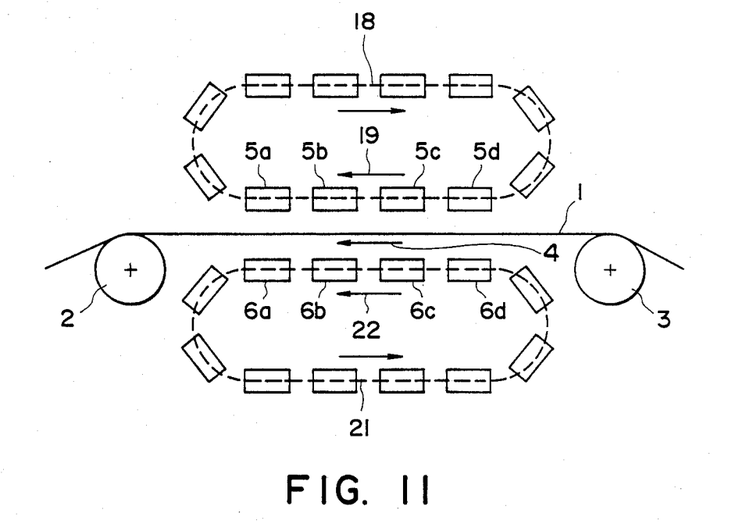
FIGS. 11 and 12 are schematic side views of still other examples of the apparatus for practicing the present invention.

FIG. 11 shows an embodiment, whereby a period in which rotary magnetic poles are held in a relatively still state with respect to a coated film is prolonged in comparison with the embodiment shown in FIG. 1. In this embodiment, rotary magnetic poles 5a, 5b, 5c . . . and 6a, 6b, 6c . . . are held on a pair of belt or catapillar-type conveyors 18 and 21 moved in the directions of arrows 19 and 22, respectively. The moving velocity is substantially equal to that of the coated film 1.

Figure 12:
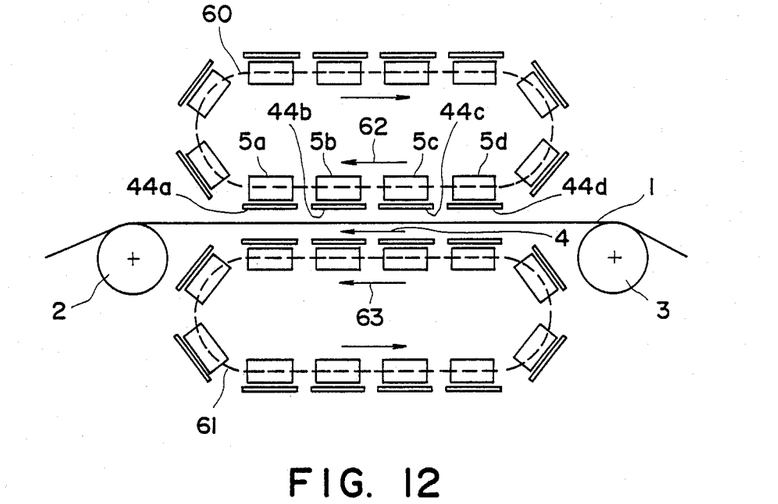

FIG. 12 shows such an embodiment corresponding to the embodiment shown in FIG. 6. In this embodiment, combinations of rotary magnetic poles 5a, 5b, 5c . . . and magnetic flux transmission filters 44a, 44b, 44c are held on a pair of belt or catapillar conveyors 60 and 61 moved in the directions of arrows 62 and 63 which are the same as the moving direction 4 of the coated film 1. The moving velocity is substantially equal to that of the coated film 1. In this embodiment as in the embodiment of FIG. 11, the pairs of magnetic field orientation devices (5a, 6b), (5b, 6b), (5c, 6c), . . . are held in a relatively still state with respect to the coated film for a longer period, so that a sufficient circular orientation is provided.

As described hereinabove in detail, according to the conventional process for providing circular orientation by magnetic field, a magnetic recording medium accompanied with a change in output in the circular direction due to mechanical orientation has been obtained, because the rotary magnetic poles are rotated simply in one direction. In contrast thereto, according to the process of the present invention, there is provided a disk-form magnetic recording medium having a change in output along the circular direction suppressed to an extremely low level by a simple method of applying a weaker magnetic field in the direction of a coated film in which a mechanical orientation is stronger. More specifically, at present, there is a standard with respect to video floppy disks that the output change on the output envelope (as defined by $(a-b)/(a+b)$ where a denotes the maximum output and b denotes the minimum output) should be 10% or below. The process of the present invention could suppress the output change to 5% or below.

Further, in the conventional production of video floppy disks, a coating method minimizing the orientation has been adopted when magnetic powder having a large axial ratio is used, or mechanical orientation in the coating has been suppressed by using magnetic powder having a small axial ratio. As a result, the squareness ratio relating to the recording density in the circular direction has been of the order of 0.6–0.65. In the process of the present invention, however, the orientation force is controlled during the magnetic field orientation, so that the mechanical orientation need not be suppressed, and magnetic powder having a large axial ratio as used in the production of magnetic tapes can be used. As a result, the squareness ratio at any points in the circular direction with respect to a magnetic field in the circular direction could be increased to the order of 0.75–0.8. On the other hand, the squareness ratio in the radius direction (i.e., with respect to a magnetic field in the radius direction) was of the order of 0.5–0.55. Accordingly, a ratio of the squareness ratio in the circular direction to that in the radius of about 1.35 or higher, particularly 1.4 or higher, was obtained.

Such a high circular-to-radius ratio with respect to a squareness ratio could be realized in a magnetic hard disk which was obtained by coating a magnetic paint onto individual disk substrates one by one so as to suppress a unidirectional mechanical orientation (Japanese Laid-Open Patent Application No. 10605/1965), but was realized in a flexible magnetic sheet for the first time by the magnetic field orientation according to the present invention in a type of process adapted to mass production as used for production of magnetic tapes wherein a wide and long flexible base film was coated with a magnetic paint in a manner resulting in mechanical orientation, and the coated film was punched into disks.

What is claimed is:

1. In a process for producing a magnetic recording medium, comprising coating a nonmagnetic substrate with a magnetic paint and applying a rotating magnetic field for orientation to the magnetic paint in a yet unsolidified state on the substrate; the improvement which comprises forming a magnetic recording disk (a) by providing in a plane substantially parallel to the substrate surface said magnetic field for orientation, said field being stronger in a direction perpendicular to the direction of movement of the substrate as compared to the directions of movement of the substrate to thereby form a circular magnetic orientation pattern and thereafter (b) removing from said coated substrate at least one magnetic recording disk in conformity with the circular magnetic orientation pattern.

2. A process according to claim 1, wherein the magnetic field for orientation is provided by a magnetic pole rotating with oscillation.

3. A process according to claim 2, wherein the magnetic pole is provided in a plurality and disposed radially, and the angle formed between adjacent magnetic poles increases as it is distant from a line passing through the axis of rotation and running parallel to the moving direction of the substrate.

4. A process according to claim 2, wherein the magnetic pole is provided in a plurality and is disposed radially, and a magnetic field disposed closer to a line passing through the axis of relation and running parallel to the moving direction of the substrate provides a stronger magnetic field.

5. A process according to claim 1, wherein the magnetic field for orientation is provided by an electromagnet.

6. A process according to claim 1, wherein the magnetic field is provided by a combination of a magnetic pole rotating in one direction, and a magnetic flux transmission filter disposed between the magnetic pole and the coated substrate.

7. A magnetic recording medium as produced by the process according to claim 1.

8. A magnetic recording medium according to claim 7, which has a disk shape and has a squareness ratio of 0.75 or above at any point on a circular direction, which is 1.35 times the squareness ratio in the radius direction, and an output change on an output envelope of 5% or less.

* * * * *

UNITED STATES PATENT AND TRADEMARK OFFICE
CERTIFICATE OF CORRECTION

PATENT NO. : 4,824,708
DATED : April 25, 1989
INVENTOR(S) : TAKASHI SUZUKI, ET AL.   Page 1 of 3

It is certified that error appears in the above-identified patent and that said Letters Patent is hereby corrected as shown below:

ON THE TITLE PAGE,
IN [56] REFERENCES CITED

U.S. PATENT DOCUMENTS, "Grainer et al." should read --Greiner et al.--.

COLUMN 1

Line 40, "above described" should read --above-described--.
    Line 43, "sheet a" should read --sheet, a--.

COLUMN 2

Line 38, "above" should read --above- --.
    Line 43, "above described" should read --above-described--.

COLUMN 3

Line 13, "oreinta-" should read --orienta- --.
    Line 43, "ments" should read --ment--.

COLUMN 4

Line 35, "becomes" should read --become--.
    Line 40, "6a, ... 6f." should read --6a, ... 6f will be described.--.
    Line 42, "above mentioned" should read --above-mentioned--.

UNITED STATES PATENT AND TRADEMARK OFFICE
CERTIFICATE OF CORRECTION

PATENT NO. : 4,824,708

DATED : April 25, 1989

INVENTOR(S) : TAKASHI SUZUKI, ET AL.

It is certified that error appears in the above-identified patent and that said Letters Patent is hereby corrected as shown below:

COLUMN 5

Line 4, "a" should read --an--.
    Line 15, "coated film 4" should read --coated film 1--.
    Line 19, "In case" should read --In the case--.
    Line 24, "if" should read --is-- and "magetic" should read --magnetic--.
    Line 35, "and N poles," should read --are N poles,--.
    Line 42, "angle between 17a and 17b" should read --angle $\theta_3$ between 17a and 17h".
    Line 43, "angle oscillatory rotation H" should read --angle oscillatory rotation (H) --.

COLUMN 6

Line 22, "angle H" should read --angle (H) --.
    Line 38, "electromagnets" should read --electromagnet--.
    Line 65, "above mentioned" should read --above-mentioned--.

COLUMN 8

Line 30, "catapillar-type" should read --caterpillar-type--.
    Line 38, "catapillar" should read --caterpillar--.
    Line 44, "vices (5a,6b)," should read --vices (5a,6a),--.

UNITED STATES PATENT AND TRADEMARK OFFICE
CERTIFICATE OF CORRECTION

PATENT NO. : 4,824,708

DATED : April 25, 1989

INVENTOR(S) : TAKASHI SUZUKI, ET AL.    Page 3 of 3

It is certified that error appears in the above-identified patent and that said Letters Patent is hereby corrected as shown below:

COLUMN 9

Line 21, "radius" should read --radius direction--.

COLUMN 10

Line 6, "directions" should read --direction--.
Line 23, "axis of relation" should read --axis of rotation--.
Line 38, "on" should read --in--.

Signed and Sealed this

Sixth Day of March, 1990

Attest:

JEFFREY M. SAMUELS

*Attesting Officer*    Acting Commissioner of Patents and Trademarks